United States Patent
Vogt et al.

(10) Patent No.: US 7,269,396 B2
(45) Date of Patent: Sep. 11, 2007

(54) METHOD AND DEVICE FOR SUPPRESSING MULTIPATH INTERFERENCE IN A RECEIVER FOR ELECTROMAGNETIC WAVES

(75) Inventors: Lothar Vogt, Barienrode (DE); Detlev Nyenhuis, Sibbesse (DE)

(73) Assignee: Robert Bosch GmbH, Stuttgart (DE)

( * ) Notice: Subject to any disclaimer, the term of this patent is extended or adjusted under 35 U.S.C. 154(b) by 249 days.

(21) Appl. No.: 10/473,563

(22) PCT Filed: Mar. 23, 2002

(86) PCT No.: PCT/DE02/01084

§ 371 (c)(1),
(2), (4) Date: Mar. 22, 2004

(87) PCT Pub. No.: WO02/078214

PCT Pub. Date: Oct. 3, 2002

(65) Prior Publication Data

US 2004/0142669 A1  Jul. 22, 2004

(30) Foreign Application Priority Data

Mar. 27, 2001 (DE) .................................. 101 15 053

(51) Int. Cl.
*H04B 17/02* (2006.01)
(52) U.S. Cl. ................. 455/135; 455/179.1; 455/193.1; 455/226.2
(58) Field of Classification Search ................. 455/135, 455/179.1, 193.1, 226.2
See application file for complete search history.

(56) References Cited

U.S. PATENT DOCUMENTS

| | | | |
|---|---|---|---|
| 5,345,602 A | | 9/1994 | Wiedemann et al. |
| 6,141,536 A | * | 10/2000 | Cvetkovic et al. ............ 455/45 |
| 6,172,970 B1 | | 1/2001 | Ling et al. |
| 6,952,384 B1 | * | 10/2005 | Shoji et al. ............... 369/44.35 |

FOREIGN PATENT DOCUMENTS

| | | |
|---|---|---|
| EP | 0 961 419 | 12/1999 |
| EP | 0 967 746 | 12/1999 |

* cited by examiner

*Primary Examiner*—Duc M. Nguyen
*Assistant Examiner*—Eric J Elcenko
(74) *Attorney, Agent, or Firm*—Kenyon & Kenyon LLP

(57) ABSTRACT

A method and a device for a receiver for electromagnetic waves having at least two antennas are described; using this method and this device it is possible to effectively suppress multipath interference, while a portion of the antenna signals may also be utilized for other purposes at least temporarily, e.g., to allow better utilization of the possibilities of RDS activities. To do so, a first antenna signal (1) is used as the basis for generating a playback signal (23) when the signal quality of the first antenna signal (1) is above a defined threshold for undisturbed reception—case 1. In this case 1, the signal quality of the first antenna signal (1) is determined. If the signal quality of the first antenna signal (1) falls below this threshold—case 2—then a new signal y generated from at least two antenna signals (1, 2) is used as the basis for generating the playback signal (23). In case 2, the signal quality of new generated signal y and the signal quality of at least one antenna signal (2) are determined. New generated signal y is used as the basis for generating the playback signal (23) as long as the signal quality determined for the one antenna signal (2) is below this threshold and is evaluated as being inferior to the signal quality of the new generated signal y.

6 Claims, 1 Drawing Sheet

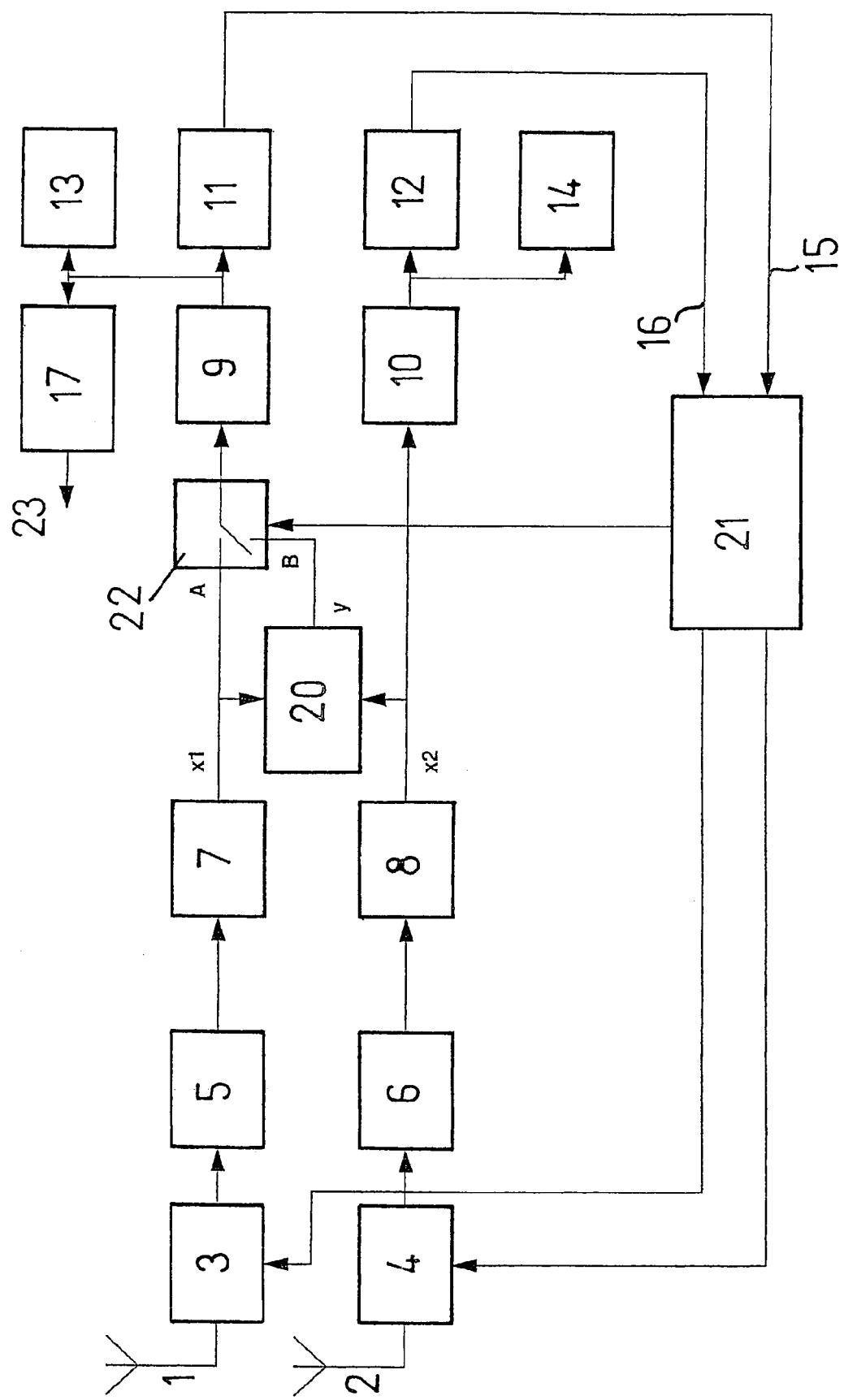

METHOD AND DEVICE FOR SUPPRESSING MULTIPATH INTERFERENCE IN A RECEIVER FOR ELECTROMAGNETIC WAVES

FIELD OF THE INVENTION

The present invention relates to a method for suppressing multipath interference in a receiver for electromagnetic waves, in particular in an FM or VHF receiver, a new signal being generated from at least two antenna signals. In addition, the present invention relates to a device for suppressing multipath interference in a receiver for electromagnetic waves, in particular in an FM or VHF receiver, having signal generating means for generating a new signal from at least two antenna signals and having a decoder for generating a playback signal.

BACKGROUND INFORMATION

In a method known from practice for suppressing multipath interference in an FM or VHF receiver, known as the ADA (autodirectional antenna) method, the new signal is generated by a suitable linear combination of at least two antenna signals. The term "diversity method" refers to a method for suppressing multipath interference in an FM or VHF receiver by switching between different antennas. The switching is performed here as a function of the particular reception field strength and signal quality. In the broadest sense, the diversity method could be considered a special case of the ADA method in which only one of the coefficients of the linear combination is not equal to zero. In addition, it is known from practice that the antenna signals of an FM or VHF receiver may be used for RDS (Radio Data System) activities.

U.S. Pat. No. 5,345,602 describes a VHF radio receiver which mixes a plurality of antenna signals with a locally generated oscillator signal and subsequently adds them up. On the basis of the resulting signal, the playback signal is then generated. At the same time, the receiver switches briefly to alternative transmission frequencies of the set transmitter in periodic intervals in a manner that is not perceptible to the human ear to determine the reception quality of these alternative transmission frequencies and stores them. If the reception quality of the transmission frequency originally set is inadequate, it is then possible to switch rapidly to the best of the alternative transmission frequencies in a manner that cannot be detected by the listener.

In addition to these AF (alternate frequency) tests, which are described in U.S. Pat. No. 5,345,602, and the PI (program identification) tests, RDS activities frequently also include monitoring of TMCs (traffic message channels).

In the case of the VHF radio receiver known from U.S. Pat. No. 5,345,602 and the method described in this conjunction, generation of the playback signal is always based on a new signal generated from a plurality of antenna signals, even when at the moment there is no multipath interference or fading effects. In addition, with respect to the known VHF radio receivers, it should be pointed out that very little time is available for the RDS activities if they are not to be perceived by a listener because the RDS processing is based on the same signal as that used in generation of the playback signal. For example, the duration of the AF test performed must not exceed a few milliseconds.

SUMMARY OF THE INVENTION

The present invention proposes a method and a device using by which multipath interference may be effectively suppressed in a receiver for electromagnetic waves, while a portion of the antenna signals may also be used for other purposes at least temporarily, e.g., to better utilize the possibilities of RDS activities.

In the method according to the present invention, this is achieved by basing the generation of a playback signal on a first antenna signal if the signal quality of the first antenna signal is above a defined threshold for reception without interference. In this case, the signal quality of the first antenna signal is determined. The new signal generated from at least two antenna signals is used as the basis for generating the playback signal if the signal quality of the first antenna signal falls below this threshold. In this case the signal quality of the new signal generated and the signal quality of at least one antenna signal are determined. The new signal generated is used as the basis for generation of the playback signal as long as the signal quality intended for the one antenna signal is below this threshold and is evaluated as being inferior to the signal quality of the new signal generated.

The device according to the present invention includes for this purpose a switch which optionally supplies the stereo decoder with a first antenna signal (switch position A) or the output signal of the signal generating means (switch position B) for generating a playback signal. In addition, optionally the first antenna signal (switch position A) or the output signal of the signal generating means (switch position B) may be sent to a first signal data acquisition unit via this switch. The device according to the present invention also includes at least one additional signal data acquisition unit for at least one additional antenna signal and a monitor circuit. This monitor circuit receives the outputs of the first signal data acquisition unit over a first channel and of the additional signal data acquisition unit over another channel. The monitor circuit evaluates these outputs to trigger the switch accordingly.

The occurrence of multipath interference or similar interference, e.g., caused by fading effects, is highly dependent on the geography. Whether and to what extent such interference will occur thus depends to a significant extent on where the receiver is located and/or in which direction it is moving. It is now proposed according to the present invention that measures for suppressing such interference shall be taken only when this interference is actually occurring. In the case of reception without interference, generation of a playback signal is therefore based simply on a first antenna signal which is also referred to as the foreground signal. The additional antenna signals which are available to the receiver and in this case are referred to as background signals may then be used otherwise for the duration of the undisturbed reception without any time limit. Generation of the playback signal is then based on a new signal generated from a plurality of antenna signals if the foreground signal has interference. Thus according to the present invention a possibility of switching between the generation of a playback signal from a foreground signal having no interference with the simultaneous use of the background signals for other purposes and generation of the playback signal from a new signal generated from a plurality of antenna signals is proposed.

Essentially, there are various possibilities for using the background signals for other purposes within the scope of the method according to the present invention. In a particularly advantageous embodiment of the method according to the present invention, at least one background signal is used continuously for Radio Data System (RDS) activities if the first antenna signal is used as the basis for generation of the playback signal. In this case there is no time limit on the RDS activities such as AF (alternate frequency) tests, PI (program identification) tests and/or the monitoring of TMCs (traffic message channels). Since the background signals do not influence the generation of the playback signal, all relevant frequencies may now be tested continuously, e.g., as part of the AF tests.

In another advantageous embodiment of the method according to the present invention, it is not necessary to forfeit the use of RDS activities even if the new signal generated is used as the basis for generation of the playback signal, i.e., no background signal is available to an unrestricted extent for the RDS activities. In this case, the new signal generated and/or at least one additional antenna signal may be utilized briefly for RDS activities in periodic intervals and in a manner that is not perceptible to the human ear.

Essentially within the scope of the method according to the present invention, the new signal may be generated from at least two antenna signals in a completely different way.

For determination of the signal quality, it has proven advantageous to determine various signal quality data, in particular reception field strength, high pass signals, symmetry signals, and the results of a multipath detection. This signal quality data may then be weighted for evaluation of the signal quality.

BRIEF DESCRIPTION OF THE DRAWING

The FIGURE shows a block diagram of a device according to the present invention for implementation of a method according to the present invention for suppressing multipath interference in an FM receiver.

DETAILED DESCRIPTION

In the variant illustrated in the sole FIGURE, two antenna signals 1 and 2 are available to the receiver. Each of the two antenna signals 1, 2 is sent to a HF (high frequency) preselector stage 3, 4 such as those known from the related art. These HF preselector stages 3, 4 each supply an analog IF (intermediate frequency) signal as the output which is sent via an IF AD converter 5, 6 to a digital IF filter 7, 8 for suppression of neighboring channels. Output signals x1 and x2 of the two IF filters 7, 8 are sent to signal generating means 20 which generate a new signal y from these two signals x1 and x2, i.e., from the two preprocessed antenna signals 1, 2.

Signal x2 is also sent via a digital FM demodulator 10 to a signal data acquisition unit 12 where the reception field strength, high pass signals, a multipath detection and symmetry signals are calculated for determining the signal quality of antenna signal 2. The output of signal data acquisition unit 12 is sent via a channel 16 to a monitor circuit 21. Simultaneously with this demodulated signal, x2 is also sent to an RDS block 14 for demodulation and decoding of the RDS data so that antenna signal 2 may be utilized for RDS activities.

Signal x1 may also be sent (via a switch 22 in switch position A) via a digital FM demodulator 9 to a signal data acquisition unit 11, the output of which is also sent over a channel 15 to monitor circuit 21. At the same time, demodulated signal x1 is sent to a stereo decoder 17 having automatic interference suppression for generating a playback signal 23 and to an RDS block 13 for utilizing antenna signal 1 for RDS activities.

In switch position B, instead of demodulated signal x1, demodulated generated new signal y is supplied to stereo decoder 17 and is then used as the basis for generating playback signal 23. In addition, demodulated signal y is sent to signal data acquisition unit 11 and to RDS block 13 for utilization of signal y for RDS activities.

Monitor circuit 21 evaluates channels 15 and 16 and/or analyzes the signal data determined by two signal data acquisition units 11, 12 and thus triggers switch 20 accordingly. In addition, two HF preselector stages 3 and 4 may also be triggered via monitor circuit 21.

If switch 22 is in switch position A, generation of playback signal 23 in stereo decoder 17 is then based on the first antenna signal 1 in a preprocessed form. In this case, the signal quality of the preprocessed first antenna signal x1 is determined with the help of signal data acquisition unit 11 and sent to monitor circuit 21 over channel 15. Monitor circuit 21 analyzes the signal quality data determined by signal data acquisition unit 11. If the signal quality of channel 15 is so good that it is above a threshold for undisturbed reception after weighting of the individual signal quality data, it is then possible to omit new signal y generated by signal generating means 20. In this period of time, the second antenna signal 2 and second channel 16 may also be utilized for RDS activities.

If reception deteriorates due to multipath effects or fading effects, the signal quality of channel 15 will be below the threshold for reception without interference after weighting of the individual signal quality data. In this case, monitor circuit 21 triggers switch 22 which then switches to switch position B.

In switch position B, new signal y generated and preprocessed by signal generating means 20 for generation of the playback signal is sent to stereo decoder 17. With the help of signal data acquisition unit 11, the signal quality of new signal y thus generated is now determined so that the signal quality data of signal y is available to monitor circuit 21 over channel 15, and the signal quality data of preprocessed second antenna signal x2 determined by signal data acquisition unit 12 over channel 16.

Only when the weighted signal quality data of channel 16, i.e., of preprocessed second antenna signal x2, again exceeds the threshold for undisturbed reception is the switch switched back to switch position A, so that second antenna signal 2 may again be used exclusively for RDS activities.

In switch position B, i.e., when the new signal y generated is used as the basis for generation of the playback signal 23, new generated signal y as well as the second antenna signal 2 and/or preprocessed second antenna signal x2 is/are used for RDS activities briefly and in a manner that is not perceptible to the human ear. RDS blocks 13 and 14 are provided for this purpose.

What is claimed is:

1. A method for suppressing multipath interference in a receiver for electromagnetic waves, comprising:
    generating a playback signal on the basis of at least one of at least two antenna signals including a first antenna signal and a second antenna signal; and
    performing one of the following groups:
    a first group including:
        generating the playback signal on the basis of the first antenna signal if a signal quality of the first antenna signal is above a defined threshold for undisturbed reception, and determining the signal quality of the first antenna signal, and a second group including:

generating a new signal from the at least two antenna signals, determining a signal quality of the new signal, determining the signal quality of one of the at least two antenna signals, and generating the playback signal on the basis of the new signal as long as the signal quality determined for one of the at least two antenna signals is below the defined threshold and is evaluated as being inferior to the signal quality of the new signal, when the new signal is used as the basis for generating the playback signal, using at least one of the new signal, the first antenna signal and the second antenna signal briefly at periodic intervals in a manner imperceptible to the human ear for a Radio Data System (RDS) activity.

2. The method as recited in claim 1, wherein:
the RDS activity includes an AF (alternate frequency) test.

3. A device for suppressing multipath interference in a receiver for electromagnetic waves, comprising:
a signal generating device for generating a new signal from at least two antenna signals;
a stereo decoder for generating a playback signal;
a first signal data acquisition unit for deriving a signal quality of signal data representing signals supplied to the first signal data acquisition unit;
a switch via which an output signal of the signal generating device is supplied to the stereo decoder and the first signal data acquisition unit, wherein:
in a first switch position of the switch, the output signal includes a first antenna signal of the at least two antenna signals, and
in a second switch position, the output signal includes a second antenna signal of the at least two antenna signals;
at least one additional signal data acquisition unit provided for the second antenna signal; and
a monitor circuit for receiving an output of the first signal data acquisition unit over a first channel and for receiving an output of the at least one additional signal data acquisition unit over another channel, the monitor evaluating the output of the first signal data acquisition unit and the output of the at least one additional signal data acquisition unit in order to trigger the switch.

4. The device as recited in claim 3, wherein:
the receiver includes one of an FM receiver and a VHS receiver.

5. The device as recited in claim 3, further comprising:
an RDS block for utilization of the second antenna signal for an RDS activity.

6. The device as recited in claim 3, further comprising:
an RDS block for utilization of the output signal for an RDS activity.

* * * * *